(12) United States Patent
Nowak et al.

(10) Patent No.: US 10,650,128 B2
(45) Date of Patent: May 12, 2020

(54) METHODS AND SYSTEMS FOR AUTOMATICALLY CONFIGURING USER AUTHENTICATION RULES

(71) Applicant: MasterCard International Incorporated, Purchase, NY (US)

(72) Inventors: Dawid Nowak, Dublin (IR); Ashley Waldron, Dublin (IR); Laurie Nicoletti, White Plains, NY (US)

(73) Assignee: Mastercard International Incorporated, Purchase, NY (US)

( * ) Notice: Subject to any disclaimer, the term of this patent is extended or adjusted under 35 U.S.C. 154(b) by 212 days.

(21) Appl. No.: 15/787,097

(22) Filed: Oct. 18, 2017

(65) Prior Publication Data
US 2019/0114404 A1 Apr. 18, 2019

(51) Int. Cl.
| | |
|---|---|
| *G06F 21/31* | (2013.01) |
| *H04L 29/06* | (2006.01) |
| *H04L 29/08* | (2006.01) |
| *G06N 3/02* | (2006.01) |
| *H04W 12/06* | (2009.01) |
| *H04W 12/00* | (2009.01) |

(52) U.S. Cl.
CPC ............ *G06F 21/316* (2013.01); *G06N 3/02* (2013.01); *H04L 63/08* (2013.01); *H04L 63/205* (2013.01); *H04L 67/306* (2013.01); *H04W 12/0027* (2019.01); *H04W 12/06* (2013.01); *H04L 63/102* (2013.01)

(58) Field of Classification Search
CPC ..... G06F 21/316; H04L 63/08; H04L 63/205; H04L 63/102; H04L 67/306; H04W 12/0027; H04W 12/06; G06N 3/02
See application file for complete search history.

(56) References Cited

U.S. PATENT DOCUMENTS

| | | | |
|---|---|---|---|
| 7,231,661 B1 | 6/2007 | Villavicencio | |
| 8,515,892 B2* | 8/2013 | Spring | G06F 17/27 706/46 |
| 9,516,053 B1* | 12/2016 | Muddu | G06F 16/254 |
| 9,654,477 B1* | 5/2017 | Kotamraju | H04L 63/102 |
| 10,521,837 B1* | 12/2019 | Mossoba | G06Q 20/401 |

(Continued)

*Primary Examiner* — Joseph P Hirl
*Assistant Examiner* — Thomas A Gyorfi
(74) *Attorney, Agent, or Firm* — Buckley, Maschoff & Talwalkar LLC (57) ABSTRACT

Systems and processes for automatically configuring user authentication rules for each of a plurality of users for use in transactions. A neural network engine receives first party preferences data from a first party computer that includes user authentication requirement criteria associated with a plurality of transaction types, and receives at least two of user behavior data, user historical data, authenticator data associated with a mobile device of the user, and mobile device metadata. The neural network engine then generates an output value based on this data, transmits the output value to a score comparator for comparison to a required score specified by the first party, and receives feedback data from the score comparator when the output value is not within a tolerance of the required score. When the output value is within the tolerance, then the neural network engine generates user authentication rules recommendations and transmits them to the first party computer.

8 Claims, 4 Drawing Sheets

(56) References Cited

U.S. PATENT DOCUMENTS

| | | | |
|---|---|---|---|
| 2013/0198383 A1* | 8/2013 | Tseng | H04L 63/102 709/225 |
| 2013/0227712 A1* | 8/2013 | Salem | G06F 21/6218 726/30 |
| 2014/0289833 A1 | 9/2014 | Briceno et al. | |
| 2016/0239771 A1 | 8/2016 | Gukal et al. | |
| 2017/0093920 A1* | 3/2017 | Ducatel | G06F 21/316 |
| 2017/0295181 A1* | 10/2017 | Parimi | H04L 63/10 |
| 2018/0041518 A1* | 2/2018 | Jacobs | H04W 4/029 |
| 2018/0089519 A1* | 3/2018 | Raziel | G06K 9/00892 |
| 2018/0189466 A1* | 7/2018 | Raviv | G06F 21/316 |
| 2019/0012441 A1* | 1/2019 | Tuli | G06F 21/316 |

\* cited by examiner

METHODS AND SYSTEMS FOR AUTOMATICALLY CONFIGURING USER AUTHENTICATION RULES

FIELD OF THE INVENTION

Embodiments described herein generally relate to processes for automatically configuring user authentication rules. More particularly, embodiments relate to automatically configuring user authentication rules for each of a plurality of users, such as but not limited to consumers, for use in transactions, such as purchase transactions.

BACKGROUND

More and more transactions involve a user operating a mobile device, such as a smartphone. A common example of a transaction is a purchase transaction, wherein the user or consumer utilizes his or her mobile device to purchase goods and/or services from a merchant. It is important to securely authenticate users involved in transactions, and authentication typically includes prompting the user to enter a personal identification number ("PIN") or the like. However, it is becoming increasingly important to provide additional authentication layers (sometimes referred to as "multi-factor" authentication) for improved security and authentication.

Many mobile devices include one or more authenticators or authentication components that can be utilized by users or consumers to input authentication data during a transaction. For example, a smartphone may include one or more authenticators, such as a fingerprint sensor, a digital camera (that can be utilized to obtain facial data or iris scan data, for example), a keypad and/or touch screen (that can be used to enter a predetermined pattern and/or a personal identification number (PIN), and the like). However, mobile device market fragmentation has resulted in many different types of mobile devices, for example, smartphones and/or tablet computers running different flavors of the Android™ operating system (OS), which are fabricated by different manufacturers and support different sets and/or types of authenticators. Each mobile network operator (MNO) typically supports a very large number of users or subscribers to its platform, which makes it difficult or nearly impossible for an NMO to determine one optimal set of authentication components that are common to all the mobile devices currently utilizing the mobile telephone network, and that also meet the security criteria envisaged by an entity (such as an issuer of payment card accounts). MNO's attempt to solve this problem by designating "default rules" to cover all users regarding user authentication. However, such default rules are usually generic to accommodate all the different types of mobile devices at the expense of excluding newer or more secure authenticators, for example, that may be found on "flagship" mobile devices that have not yet achieved much market penetration.

Thus, methods have been proposed which enable end users (consumers) to select one or more authentication components available on his or her own mobile device for use to provide authentication data, and/or to override the authenticators associated with the default rules. However, this approach has disadvantages. A first disadvantage is that users or consumers must be willing and able to take action to designate one or more available mobile device authenticators in accordance with authentication requirements of third party entities, such as issuer financial institutions. A second disadvantage is that an entity, such as an MNO, must also provide a facility (such as a web portal) which is accessible to users for selecting and applying any necessary changes to designate one or more authentication components.

It would therefore be desirable to provide methods and systems that automatically configure user authentication rules for use in transactions (such as purchase transactions and/or payment transactions) for each of a plurality of users and their mobile devices, which processes and/or systems satisfy various predefined criteria (such as third party entity authentication rules), use available mobile device authentication components, account for one or more risk factors, and/or accommodate consumer preferences.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments, wherein.

DETAILED DESCRIPTION

Reference will now be made in detail to various novel embodiments, examples of which are illustrated in the accompanying drawings. It should be understood that the drawings and descriptions thereof are not intended to limit the invention to any particular embodiment(s). On the contrary, the descriptions provided herein are intended to cover alternatives, modifications, and equivalents thereof. In the following description, numerous specific details are set forth in order to provide a thorough understanding of the various embodiments, but some or all of these embodiments may be practiced without some or all of the specific details. In other instances, well-known process operations have not been described in detail in order not to unnecessarily obscure novel aspects.

A number of terms will be used herein. The use of such terms is not intended to be limiting, but rather are used for convenience and ease of exposition. For example, as used herein, the term "user" may be used interchangeably with the term "consumer" or "cardholder" and are used herein to refer to a person, individual, business or other entity that owns (or is authorized to use) a financial account such as a payment card account (for example, a credit card account). In addition, the term "payment card account" may include a credit card account, a debit card account, and/or a deposit account or other type of financial account that an account holder may access. The term "payment card account number" includes a number that identifies a payment card system account or a number carried by a payment card, and/or a number that is used to route a transaction in a payment system that handles debit card and/or credit card transactions and the like. Moreover, as used herein the terms "payment card system" and/or "payment network" refer to a system and/or network for processing and/or handling purchase transactions and related transactions, which may be operated by a payment card system operator such as MasterCard International Incorporated, or a similar system. In some embodiments, the term "payment card system" may be limited to systems in which member financial institutions (such as banks) issue payment card accounts to individuals, businesses and/or other entities or organizations.

In general, and for the purposes of introducing concepts of novel embodiments described herein, provided are systems and methods for automatically determining user authentication rules for each of a plurality of users. More specifically, in some implementations a neural network automatically generates user authentication rules for each of a plurality of users by using historical data and unsupervised learning without human input, to thus find the optimal or best set of authentication rules. Examples of the types of input data utilized by the neural network may include, but are not limited to, requirements data or rules data provided by an entity or first party (such as rules provided by an issuer financial institution), user preferences data (for example, associated with the types of authenticator(s) a user prefers using), and authenticator component capability data of a mobile device belonging to each user. Thus, system embodiments described herein automatically generate user authentication rules to associated with the mobile device of each of a plurality of users (such as consumers) for use to conduct different types of transactions (such as purchase transactions and/or payment transactions and the like). Some disclosed embodiments therefore allow for an improved purchase transaction and/or payment transaction user experience for both consumers and merchants, while also ensuring adequate and/or the appropriate security for each type of transaction.

Throughout this disclosure, examples of automatically configuring user authentication rules in the context of a financial transaction will be described. However, those skilled in the art will appreciate that novel embodiments disclosed herein may be used with desirable results to automatically configure authentication rules for users with relation to conducting many other types of transactions. For example, some implementations could be used to automatically configure user authentication rules to associate with users for permitting access to a valuable resource in the real world, or permitting access to a valuable commodity in a digital environment (or cyber world). In addition, implementations could be used to configure different levels of user authentication rules. For example, in some embodiments a rules recommender computer may assign weak authentication rules for providing access to a business address of a consumer, but may assign strong (or stronger) authentication rules for providing access to sensitive user data, in order to protect access to sensitive data of a consumer, such as the full medical history of that person.

Figure 1:
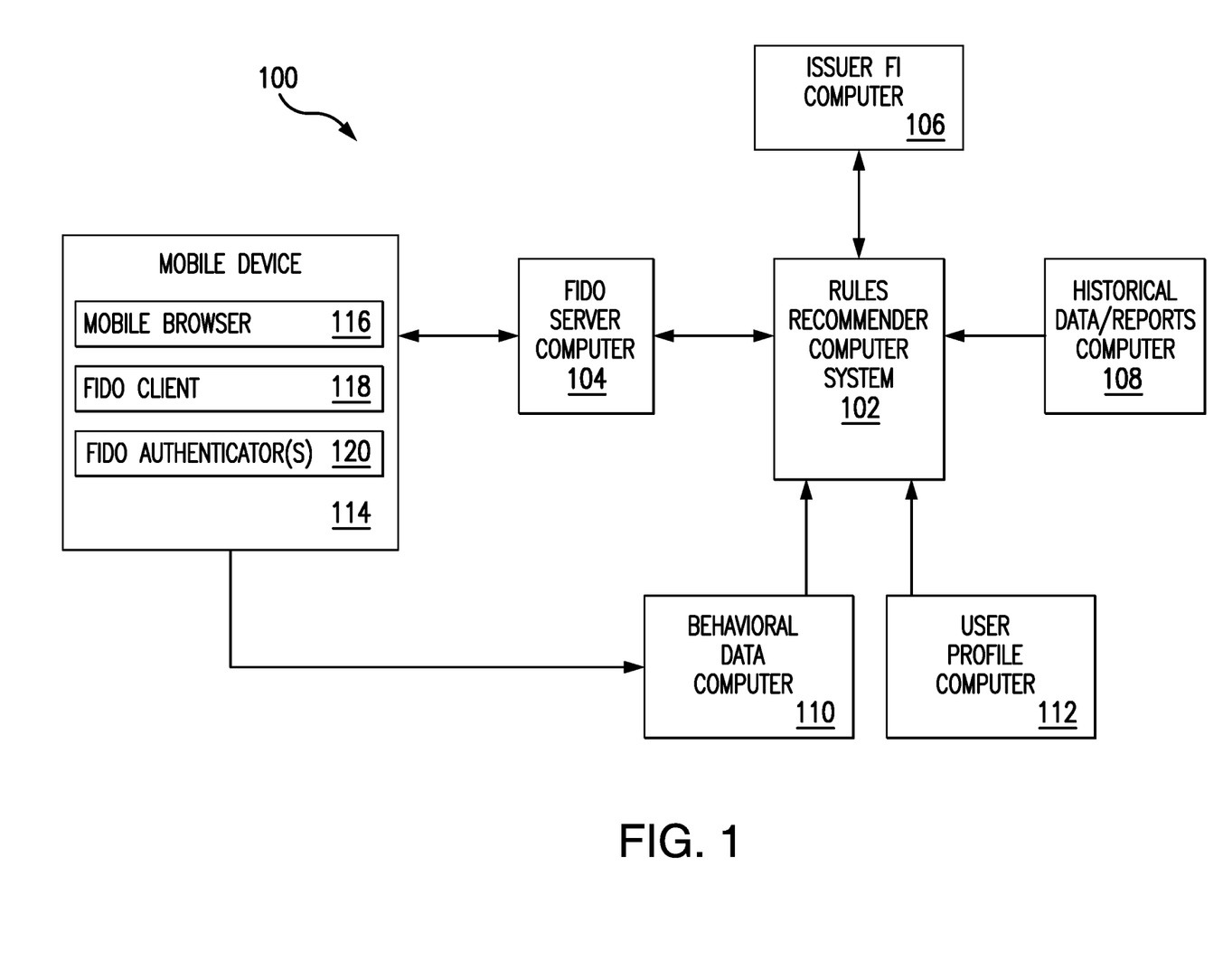
FIG. 1 is a block diagram of a user authentication rules recommendation system in accordance with an embodiment of the disclosure.

FIG. 1 is a block diagram of a user authentication rules recommendation system 100 in accordance with some implementations. The user authentication rules recommendation system 100 features a rules recommender computer system 102, which in some implementations includes a neural network. A neural network is a computing system made up of a number of simple, highly interconnected processing elements (such as processors or microprocessors), which process information by their dynamic state response to external inputs. The processing elements of a neural network can be thought of as an interconnected group of nodes, akin to the vast network of neurons in a brain. The many simple processors (or nodes) take the weighted sum of their inputs from other processors, and are typically connected in layers. Thus, signals travel from a first (input) layer, to the last (output) layer (and there may be one or more intermediate layers). Modern neural network projects typically have a few thousand to a few million neural units (simple processors) and millions of connections, and the signals and state of the artificial neurons are real numbers, typically between 0 and 1. A threshold function or limiting function on each connection and on the unit itself may be utilized, so that any particular signal must surpass the limit before propagating. In addition, back propagation is typically utilized, which is the use of forward stimulation to modify connection weights, and is implemented to train the network using known correct outputs. In some neural network systems, such training can require thousands of cycles of interaction.

As shown in FIG. 1, the rules recommender computer system 102 is operably connected to a Fast Identity Online Alliance ("FIDO") server computer 104 (which receives data from a user mobile device 114), an issuer financial institution (FI) computer 106 (which is an example of a first party computer), a historical data/records computer 108, a user behavioral data computer 110, and a user profiles computer 112. During operation, the rules recommender computer system 102 interacts with these devices and/or entities to obtain input data, and then processes the input data to automatically determine user authentication rules for each of a plurality of users (who may be using many different types of mobile devices) for application when each of the users engage in a particular type of transaction. It should be understood that, although FIG. 1 depicts only a single rules recommender computer system 102, a single consumer mobile device 114, a single FIDO server 104, a single issuer FI computer 106, and a single historical data computer 108, in practice many such devices and/or computers may be involved in a system in accordance with embodiments described herein. In addition, a plurality of databases (not shown) may be utilized which contain, for example, user behavioral data and/or user profile data and the like. Thus, in accordance with processes described herein, the user authentication rules generated by the rules recommender computer system 102 may be provided to the issuer FI computer 106 for use in authenticating users or consumers or cardholders who conduct financial transactions (such as purchase transactions) with their mobile devices (using, for example, their payment card accounts), or who conduct other types of transactions (such as to gain access to a secure building) with their mobile devices.

The mobile device 114 shown in FIG. 1 may include a number of logical and/or functional components (in addition to the normal components typically found in a mobile device), such as a mobile browser 116, FIDO client 118, and one or more FIDO authenticator(s) 120. Accordingly, in some embodiments, some of the components of the mobile device 114 may be configured based on or for use with the FIDO standards promulgated by the Fast Identity Online Alliance (available at www.fidoalliance.org, and incorporated herein by reference in their entirety for all purposes). However, other standards or implementations may also be used with desirable results.

Examples of FIDO authenticators 120 include, but are not limited to, a fingerprint reader, a voice reader, a touch screen display, and a digital camera (which may be utilized, for example, to obtain facial recognition data or the like). It should be understood that some mobile devices 114 may include two or more of such authenticators 120 in different combinations (for example, a particular brand and/or type of smartphone may include a touch screen, a voice reader and a camera, but not a fingerprint reader, while other types of mobile devices and/or other smartphone types may include all four devices). Moreover, some types of mobile devices may only include one type of authenticator, for example a microphone for obtaining voice data of a user, which voice data can then be utilized to perform a voice recognition and/or voice authentication process.

Figure 2:
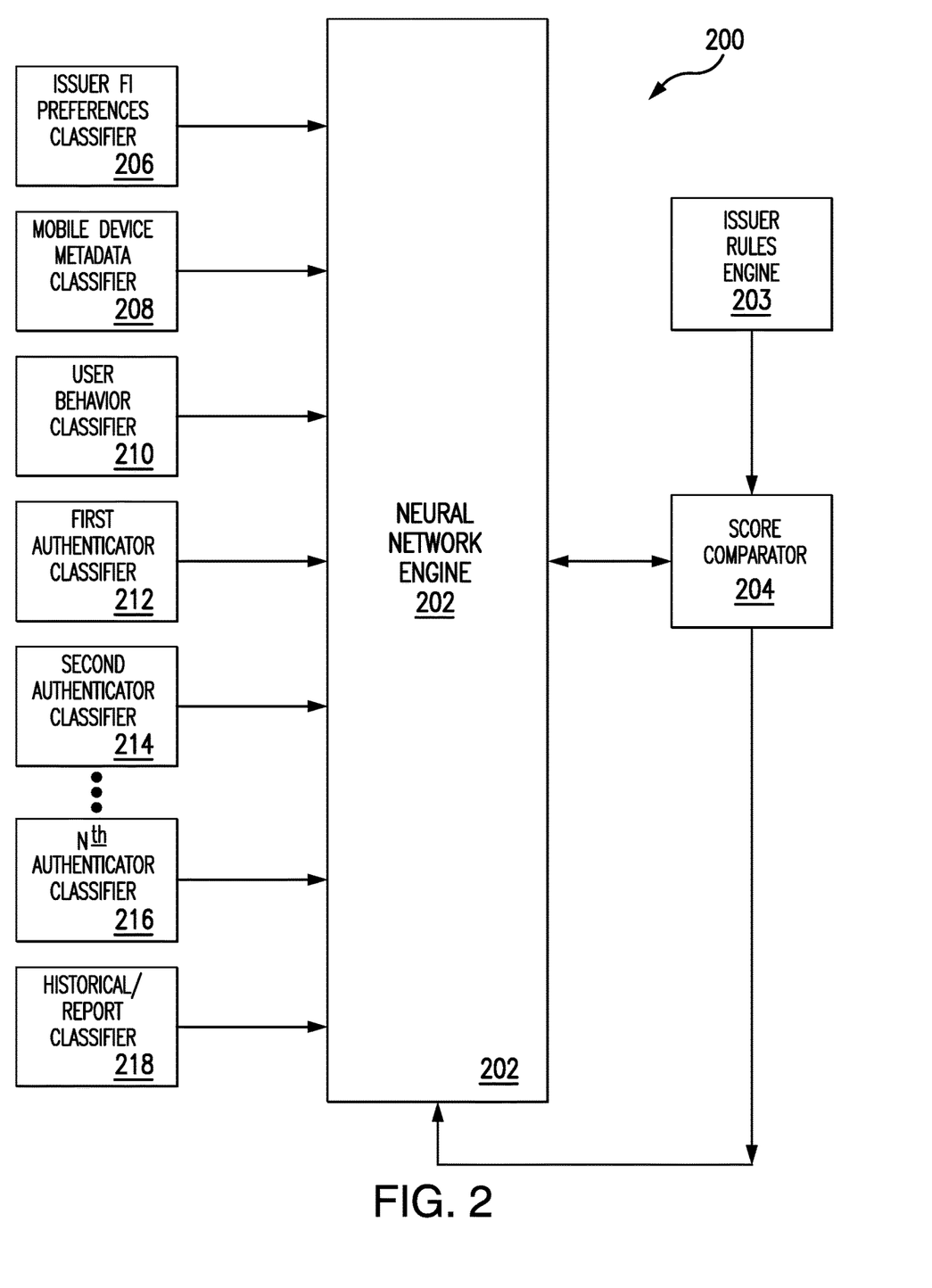
FIG. 2 is a functional block diagram of an embodiment of a rules recommender system according to some embodiments of the disclosure.

FIG. 2 is a functional block diagram of an embodiment of a rules recommender system 200, which includes a neural network engine 202, an issuer rules engine 204, and a score comparator 206. The neural network engine 202 utilizes a plurality of different types of input data to derive the user authentication rules in accordance with processes described herein. Accordingly, in the example embodiment shown in FIG. 2, a plurality of classifiers 206-218 are configured for receiving unstructured data signals and for mapping them into data signals which can then be input to the neural network engine 202. In this example, the classifiers may include one or more of an Issuer financial institution (FI) preferences classifier 206, user mobile device metadata classifier 208, user behavior pattern classifier 210, a first authenticator classifier 212, a second authenticator classifier 214, an "Nth" authenticator classifier 216, and historical and/or report classifier 218.

Referring to FIG. 2, the issuer FI preferences classifier 206 provides input data to the neural network engine 202 that may specify the use of one or more authenticators for a particular type of transaction depending on a particular issuer FI's fraudulent transaction tolerance. For example, an issuer FI may be willing to accept a five percent (5%) fraudulent transaction rate for low value purchase transactions (defined as purchase transactions having a value that is less than or equal to twenty-five dollars ($25)), and thus only require the use of one authenticator, such as a fingerprint scanner, of the user's mobile device to authenticate a user during a purchase transaction. However, the same issuer FI may only be willing to accept a two and a half percent (2.5%) fraudulent transaction rate for medium value purchase transactions (defined as purchase transactions having a value of between twenty-five dollars and one hundred dollars ($25-$100)), and an even smaller fraud tolerance percentage rate for higher value transactions. Thus, for example, the issuer FI may require a "secure" authentication rule be used for a purchase transaction having a value of seventy-five dollars ($75), which requires the user of a mobile device to utilize two or more authenticators (such as conduct an iris scan and a fingerprint scan) which could be inconvenient from the perspective of a user or consumer. For a two hundred-dollar ($200) value purchase transaction (considered to be a high value transaction), the user may be required to use two or more authenticators of his or her mobile device in addition to providing one or more other form(s) of cardholder verification method(s) (CVMs), such as entry of a personal identification number (PIN) and/or entry of a finger swipe pattern (entered by using the touch screen of his or her mobile device). Thus, the neural network engine 202 processes the issuer FI preferences data and, in concert with other input data, captures the trade-offs that must be made between usability and security. In addition, other issuer FIs may have different rules involving different definitions of low value, medium value, and/or high value transactions (or different rules associated with other types of predefined value levels or tiers), and that may differ depending on, for example, the creditworthiness of the cardholder.

In some embodiments, these considerations are translated into a score that is then used as a reference point during neural network training.

The mobile device metadata classifier 208 may receive data that includes, but is not limited to, the make and model of the user's mobile device, and data indicating the number and/or type of authenticator(s) available. Other types of metadata may include contacts in an address book, pictures in a gallery, operating system settings, installed applications, documents, music files, and the like. In some cases, a mobile device identifier may correspond to a mobile device that is considered to be safer than another type of mobile device (which may be due to, or based on, various security measures inherent in a particular mobile device and/or the presence of certain types of mobile device components).

The mobile device metadata may also indicate whether or not a particular mobile device can be deemed as potentially unsafe. For example, mobile device metadata may indicate that a particular user's mobile device utilizes the Android™ operating system (OS) and has been "rooted." A rooted Android™ mobile device is one in which the operating system has been unlocked, which permits the user to install unapproved applications (apps), delete unwanted "bloatware," update the OS, replace the firmware, and/or generally customize anything associated with the mobile device OS. Some of these actions may render the mobile device unsafe, for example, if the user unwittingly loads malware and/or malicious code. The equivalent term for unlocking the Apple OS (for example, the iOS of an iPhone) is "jailbreaking." Thus, a jailbroken or rooted mobile device may contain unsafe apps, malware, and/or other forms of insecure code, making that user's mobile device a possible security risk with regard to transaction processing. In such cases, an entity, such as an issuer FI, may require an increased level of security for authenticating the user in order to permit purchase transactions. For example, the issuer FI may require a user of a rooted device to provide multiple types of authentication data (perhaps by using two or more mobile device authenticators) for all purchase transactions regardless of value, to offset the perceived security risk. Alternately, some issuer FIs may refuse to allow the user to utilize such a rooted or jailbroken mobile device to perform any financial transactions, such as purchase transactions.

Mobile device metadata could also include useful information concerning the owner (user) of the mobile device, such as shopping behavior data (concerning purchases made on particular days of the week and the like), location data, social network data, etc. Such metadata may be utilized to determine user patterns and/or to change authentication requirements. For example, mobile device location data could be used for geographic-fencing purposes so that when a determination is made that the user mobile device is outside a radius of where the user normally lives and shops, then a more secure user authentication rule is required for all transactions requiring a credit card. In another example, social network data and/or browsing history data may be used to determine when a transaction does not fit into a normal use pattern, and then a more secure user authentication rule required for all transactions requiring a credit card. For example, if a consumer has a domestic shopping pattern of conducting shopping on a Thursday or Friday, then a step-up in the security for an authentication rule would be required on a Monday. Thus, any sudden difference in behavior and/or in the user's device settings could indicate that somebody is trying to spoof the user, perhaps from a different device, and thus increased security in the form or requiring satisfaction of more stringent authentication rules may be instituted.

User behavioral classifier 210 may receive data that includes, but is not limited to, user behavioral pattern data, which could be useful with regard to deriving authentication rules that provide the most optimal solution for a particular user. For example, if the user's mobile device includes three or more authenticators, the user behavioral data may indicate that the user or consumer favors use of a fingerprint authenticator when conducting purchase transactions. Thus, in this case the neural network engine 202 should not propose use of a facial data authenticator for when that user conducts purchase transactions. In another example, a user who typically utilizes a security pattern during a transaction for authentication purposes (for example, by moving his or her finger across a touch screen of the mobile device to match a predetermined pattern), should not be required (due to authentication rules derived by the neural network engine 202) to utilize a PIN as an authentication method. Thus, previous use of one or more authenticators by a user could be weighted more heavily than other available authenticators and/or authentication methods during neural network engine 202 processing. In addition, the types of transactions for which the user authenticated in the past, and their frequency, may also be taken into account when determining user authentication rules regarding the type of authenticator to require a user or consumer to utilize for a particular type of transaction in the future. In addition, such user behavior data could be used to determine if and/or when the user has dramatically changed his or her behavior (for example, switched from Chrome™ to Firefox™, and/or used a different finger to unlock the user's mobile device, or the like). Any such dramatic change may indicate possible fraud (i.e., a vandal impersonating the user), which could result in a step-up in security for an authentication rule (for example, now require fingerprinting in addition to entry of a mobile PIN).

The neural network engine 202 may also receive authenticator data from the first authenticator classifier 212, second authenticator classifier 214, and the Nth authenticator classifier 216 (there may be many authenticator classifiers depending on how many different types of authenticators could be in use by users), which are associated with different types of authenticators. For example, a first authenticator may generate fingerprint sensor data, a second authenticator may generate facial data, and the third authenticator may generate iris scan data. In addition, there may be other types of authenticators configured for generating other types of biometric data.

Referring again to FIG. 2, a historical and/or report classifier 218 may receive data that is based on historical transactions data gathered by an entity, such as a payments processing company (like MasterCard International Incorporated, the assignee of the present application), or may be associated with other historical data gathered by other sources. Information extracted from such data may include, for example, an average level of fraud per transaction type, which type of authenticators were used, and the mobile device make and model number associated with a user.

Figure 3:
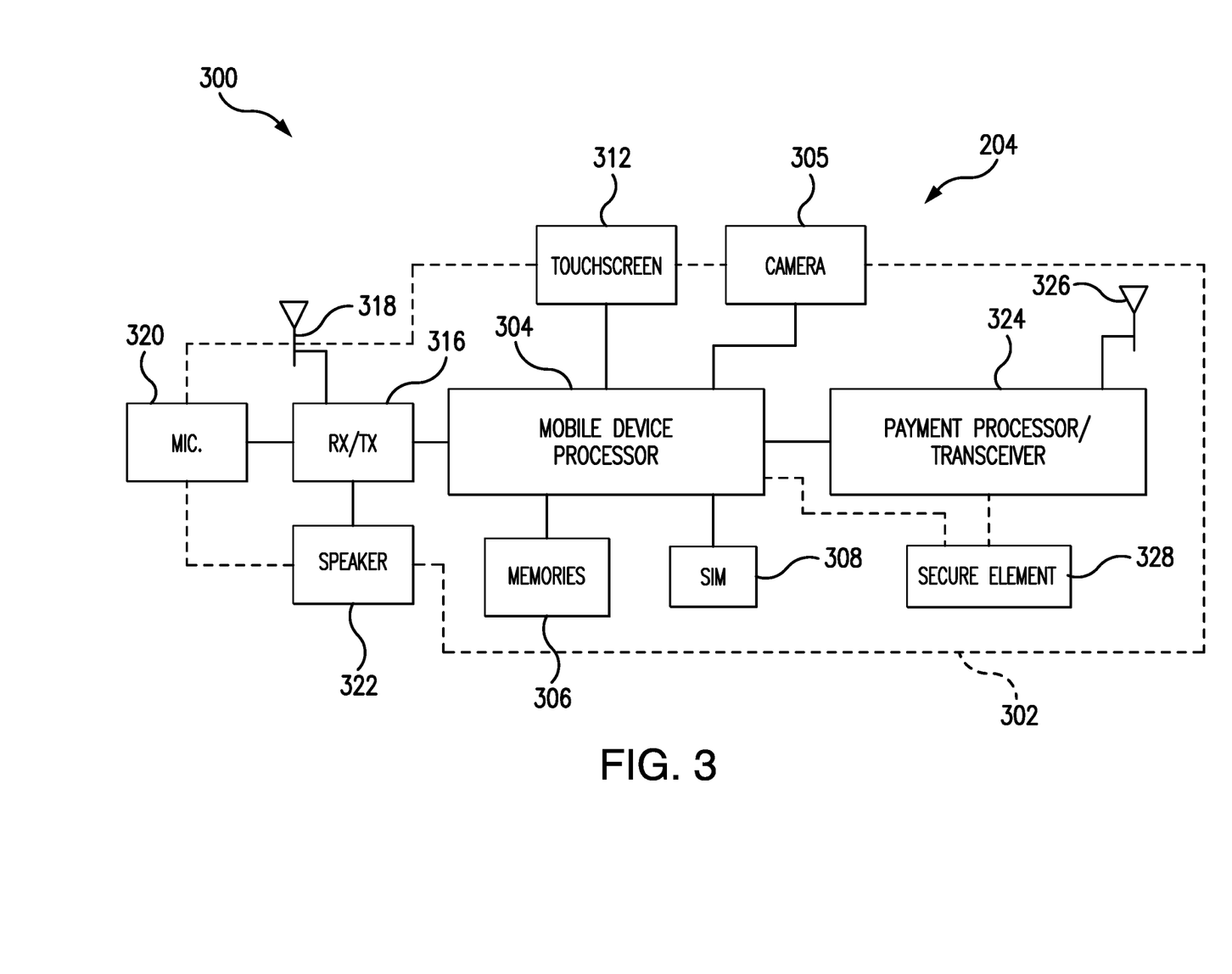
FIG. 3 depicts an embodiment of a mobile device including components configured for authenticating a user in accordance with aspects of the disclosure.

FIG. 3 is a block diagram of an embodiment of a user mobile device 300 to illustrate some hardware aspects. In this example, the mobile device 300 is a smartphone that can be used by a consumer to carry out one or more types of transactions. However, the smartphone 300 could be another type of device, such as a tablet computer or laptop, having wireless communications capability. In some embodiments, the novel functionality described herein may result at least partially from software and/or firmware of the smartphone 300.

The smartphone 300 may include a conventional housing (indicated by dashed line 302 in FIG. 3) that contains and/or supports the other components of the smartphone. The housing 302 may be shaped and sized to be held in a user's hand, and may for example exhibit the type of form factor that is common with the current generation of smartphones. The smartphone 300 further includes a mobile device processor 304 for controlling over-all operations.

Other components of the smartphone 300, which are in communication with and/or controlled by the mobile device processor 304, include one or more memory devices 306 (such as program and working memory, etc.), a conventional SIM (subscriber identification module) card 308, a camera 305, and a touchscreen 312 (which serves as the primary input/output device) for receiving input information from the user and for displaying output information to the user. The smartphone 300 may also include physically-actuatable switches and/or controls (not shown), such as an on/off/reset switch, a menu button, a "back" button, a volume control dial or switch, and the like.

The smartphone 300 also includes receive/transmit circuitry 316 that is also in communication with and/or controlled by the mobile device processor 304. The receive/transmit circuitry 316 is coupled to an antenna 318 and provides the communication channel(s) by which the smartphone 300 communicates via a mobile telephone communication network (not shown). Thus, the receive/transmit circuitry 316 may operate both to receive and transmit voice signals, in addition to performing data communication functions. As is known to those who are skilled in the art, such data communication may be via HTTP (HyperText Transfer Protocol) or other communication protocol suitable for carrying out data communication over the Internet and/or other types of computer networks.

The smartphone 300 further includes a microphone 320 coupled to the receive/transmit circuitry 316. Of course, the microphone 320 receives voice input from the user. In addition, a speaker 322 is included to provide sound output to the user, and is coupled to the receive/transmit circuitry 316.

The receive/transmit circuitry 316 may operate in a conventional fashion to transmit, via the antenna 318, voice signals generated by the microphone 320, and to reproduce, via the speaker 322, voice signals received via the antenna 318. The receive/transmit circuitry 316 may also handle transmission and reception of text messages and other data communications via the antenna 318.

The smartphone 300 may also include a payment processor/transceiver 324 that is partly or wholly dedicated to implementing NFC communications functionality of the smartphone 300. Thus, the smartphone 300 may also include a loop antenna 326 coupled to the payment processor/transceiver 324. In some embodiments, the payment processor/transceiver 324 may partially overlap with the mobile device processor 304 of the smartphone 300. Moreover, the payment processor/transceiver 324 and/or the mobile device processor 304 may be operably connected to a secure element 328. The term "secure element" is well known to those who are skilled in the art, and typically refers to a device that may include a small processor and volatile and/or nonvolatile memory (not separately shown) that is secured from tampering and/or reprogramming by suitable measures. In some embodiments, the secure element 328 may be provided as part of the SIM card 308. In other embodiments, the secure element 328 may be constituted by an integrated circuit card separate from the SIM card 308, but which may have the same or similar form factor as the SIM card 308.

It should also be understood that the smartphone 300 may be operable as a conventional mobile telephone for communication—both voice and data—over a conventional mobile telecommunications network, which is not depicted in FIGS. 1-3. Thus, the smartphone 300 may be in communication from time to time in a conventional manner with a mobile network operator ("MNO," which is not shown).

As is familiar to those who are skilled in the art, the smartphone 300 may be viewed as a small computing device. Thus, the smartphone 300 device may include one or more processors that are programmed by software, apps and/or other processor-executable steps to provide functionality as described herein. For example, the smartphone 300 may be configured to communicate with the FIDO server computer 104 (See FIG. 1) and/or with the behavioral data computer 110 to provide mobile device data and/or metadata, for example, which may be used as input data to the rules recommender computer system 102. Software, apps and/or other processor-executable steps may be stored in one or more computer-readable storage media (such as the storage devices 306 and/or the secure element 328) and may comprise program instructions, which may be referred to as computer readable program code means.

In some embodiments, a model building and rules recommendation process utilizes the rules recommender system 200 shown in FIG. 2, and in particular the neural network engine 202, Issuer rules engine 203, and score comparator 204. In some implementations, rules recommendation processing is done offline (i.e., not during user transaction processing) because the model building and rules recommendation process may be time consuming due to the large volume of historical data inputs and the large number of possible configurations of the neural network engine. Accordingly, in some implementations the model training building and user authentication recommendation process is done offline, and can also be repeated at regular intervals (for example, every two weeks) in order to regularly update the derived rules and/or user authentication policies for each entity (such as a specific issuer FI) for application to their users and/or consumers for each of a plurality of different types of transactions.

The model building and user authentication rules recommendation process involves converting unstructured incoming data into appropriate inputs by a layer of classifiers, wherein each classifier may include one or more processors. For example, face authenticator components found in different mobile devices originating from different vendors or manufacturers will provide a different measure of success. In a particular example, when the first authenticator classifier 212 is a facial authenticator classifier it will attempt to normalize the scores from different vendors into one discreet value. For example, for the same type of face sample a score associated with the Daon company's mobile biometric authentication solution is 0.97, but that same face sample associated with the Samsung company process is 0.88. The first authenticator classifier 212 will thus map these samples to a uniform value. Similarly, user behavior data could be described in various ways and include many variables, and thus during processing the user behavior classifier 208 attempts to normalize user behavior data into a set of discreet values. In another example, a mobile phone type quantifier could divide all mobile devices into classes based on their features, wherein each class would be represented by a discreet value. For example, a value of zero ("0") could indicate that a mobile device includes the latest operating system with updates, is not rooted, and includes multiple authenticators; a value of one ("1") could indicate that the user mobile device includes the latest operating system with updates, is not rooted, and includes only a single authenticator; and a value of two ("2") could indicate that the user mobile device does not include the latest operating system, is not rooted, and includes only a single authenticator. It should be understood that such criteria are exemplary only, as other considerations could also be defined and discreet values assigned to those considerations as well.

In some embodiments, the training routine includes classifying mobile phone related data and user behavior data. The training process also includes selecting a subset of available authenticators, and then classifying the input from those authenticators. Next, the inputs are applied to the neural network, the historical data is applied on a sample by sample bases, and the weights are updated. The process also includes repeating the steps of classifying the inputs from the authenticators, applying the inputs to the neural network, and applying the historical data on a sample by sample basis.

In an example, the model building and rules recommendation process for "user A" may include using authenticator hashing, wherein a classifier selects a random subset of authenticators available on user A's mobile device as an entry signal to the neural network engine 202. In addition, historical data associated with transactions conducted by user A is input to train the neural network, which may include the authenticators used by user A, whether any particular transactions were fraudulent, and the level of customer satisfaction calculated from the feedback provided by user A. In addition, policy data and/or preferences data of an issuing financial institution (or issuer FI) that issued a payment card account, for example, to user A is input to train the neural network. The output signal from the neural network is an indication of how closely the input data comes to a required score (which required score is provided by the issuer FI, and which may be associated with a particular type of transaction or transaction amount). The required score represents a trade-off, for example, between the security an issuer FI wishes to enforce for particular types of transactions and the complexity of the authentication process to impose on user A. If the output signal from the neural network engine is not within a certain tolerance of the required score (for example, plus or minus two percent), then the score comparator 204 feeds back data to the neural network engine 202 for training purposes, and the process is again initiated.

Conversely, if the output signal from the neural network engine 202 is within a certain or predetermined tolerance of the required score, then in some embodiments the score comparator 204 transmits a match indication to the neural network engine, and then the neural network engine generates and provides a user authentication recommendation (not shown) to the entity (for example, to an issuer FI). The authentication recommendation may include data identifying the authenticators used to create the model for which the output is the closest to the required score, so that these authenticators (available to user A on his or her mobile device) can be identified and then used to set an authentication policy for user A. In some embodiments, the authentication policy of issuer FI to associate with user A is then transmitted to and configured in a management information server (MIS) of a transaction system, such as a payment processing system or payment network. In some implementations, multiple models are created for each of a plurality of different transaction types.

Figure 4:
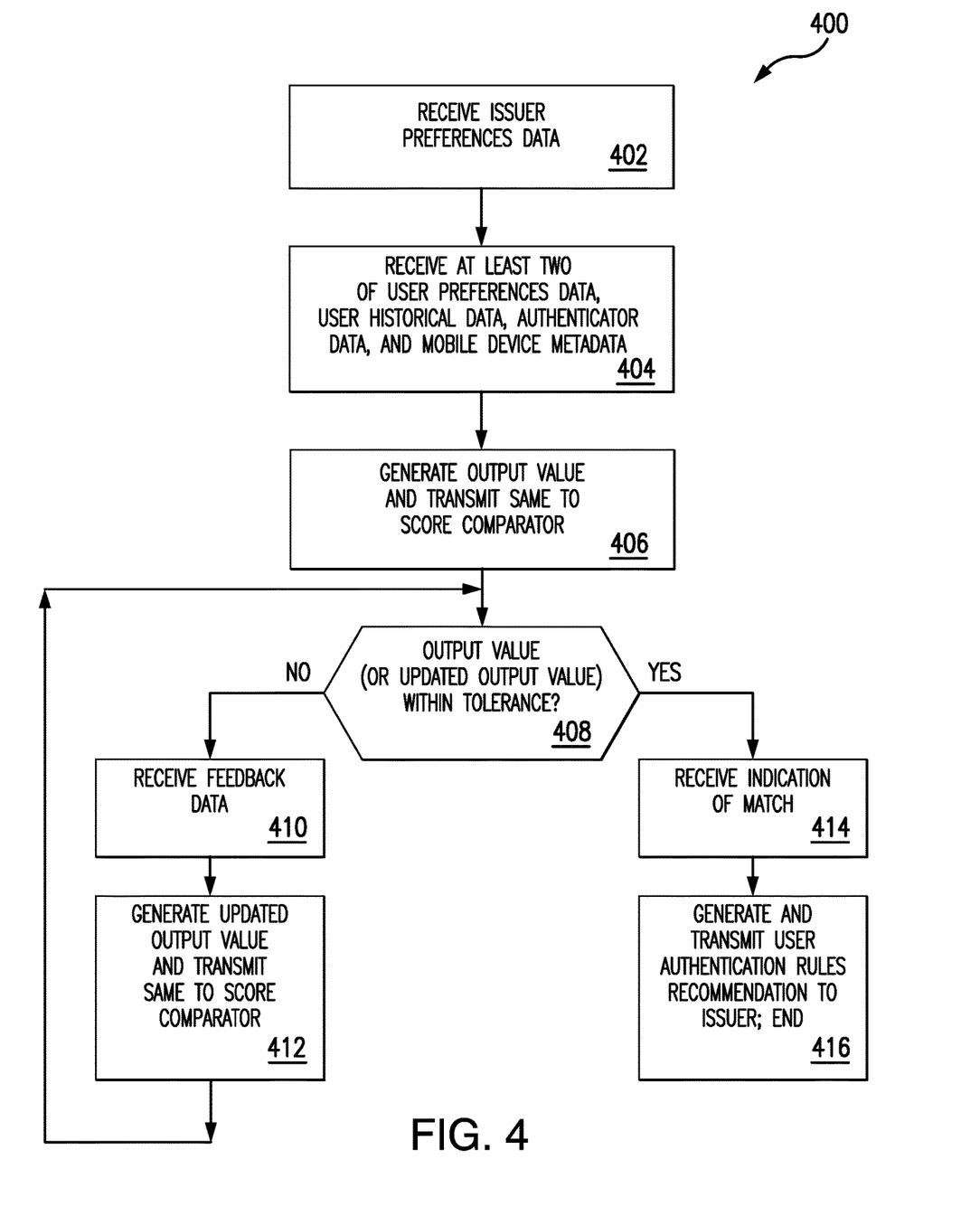
FIG. 4 is a flowchart illustrating a method for automatically determining user authentication criteria in accordance with some embodiments of the disclosure.

FIG. 4 is a flowchart 400 illustrating a method for automatically determining user authentication criteria in accordance with some embodiments. The process includes a neural network engine receiving 402, via the classifiers described herein from an issuer financial institution (FI) computer, issuer preferences data that includes user authentication requirement criteria associated with a plurality of transaction types, and also receiving 404 via other classifiers, at least two of user behavior data, user historical data, authenticator data associated with a mobile device of the user, and mobile device metadata. The neural network engine then generates 406 an output value based on the issuer preferences data and at least one of the user behavior data, the user historical data, the authenticator data associated with the mobile device of the user, and the mobile device metadata, and then transmits the output value to a score comparator, for comparison to a required score specified by an entity, such as the issuer FI. In step 408, if the output value is not within a tolerance of the required score, then the neural network engine receives 410 feedback data from the score comparator. In this case, the neural network engine then generates 412 an updated output value based on the feedback data, the issuer preferences data, and at least one of the user behavior data, the user historical data, the authenticator data associated with the mobile device of the user, and the mobile device metadata, and transmits the updated output value to the score comparator for comparison to the required score. If the updated output value is not within the tolerance of the required score, then the neural network engine will receive 410 second feedback data and the process continues. (In some embodiments, as processing continues feedback data will be provided to the neural network engine again and again until the most recent updated output value is within the predetermined tolerance of the required score.)

However, with reference again to FIG. 4, if in step 408 the output value (or the updated output value) is within the predetermined tolerance of the issuer's required score, then in some embodiments, the neural network engine receives 414 an indication of the match between the output value (or the updated output value) and the required score. The neural network engine then generates and transmits 416 user authentication rules recommendations to an entity (such as an issuer FI) for associating with the mobile device of the user, which in some embodiments includes authentication rules recommendations for each of a plurality of different transaction types to associate with the user. In some embodiments, the user authentication rules recommendations include a list of the authenticators used to create the model for a user, for use to identify those authenticators for which the output is the closest to the required score.

It should be understood that, in some of the described embodiments, the FIDO protocol may be utilized; however, those skilled in the art will realize that other protocols may be used.

It should be understood that data of particular users who use a number of different mobile devices may be utilized pursuant to the processes presented herein. Accordingly, in some embodiments users that utilize multiple mobile devices (for example, a smartphone, a tablet computer, a personal digital assistant, and/or a laptop computer) can be associated with the same authentication dataset(s) for use with any of such mobile devices to conduct transactions that require user authentication.

As used herein and in the appended claims, the term "computer" should be understood to encompass a single computer or two or more computers in communication with each other. Also, as used herein and in the appended claims, the term "processor" and/or "processors" should be understood to encompass a single processor or two or more processors in communication with each other. In addition, as used herein and in the appended claims, the term "memory" should be understood to encompass a single memory or storage device or two or more memories or storage devices.

As used herein and in the appended claims, a "server" includes a computer device or system that responds to numerous requests for service from other devices.

The flow charts and/or process(es) descriptions provided herein should not be understood to prescribe a fixed order of performing the method steps described therein. Rather the method or process steps may be performed in any order that is practicable, including simultaneous performance of steps, and/or in an order that omits one or more steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for automatically determining user authentication criteria, comprising:
   receiving, by a neural network engine from a first party computer, first party preferences data comprising user authentication requirement criteria associated with a plurality of different transaction types, the user authentication criteria comprising a fraudulent transaction tolerance associated with each transaction type of the plurality of different transaction types;
   receiving, by the neural network engine, authenticator data associated with a mobile device of a user, mobile device metadata, and at least one of user behavior data and user historical data;
   generating, by the neural network engine, an output value based on the first party preferences data, the authenticator data associated with the mobile device of the user, the mobile device metadata, and at least one of the user behavior data and the user historical data;
   transmitting, by the neural network engine to a score comparator, the output value for comparison to a required score specified by the first party;
   receiving, by the neural network engine from the score comparator, feedback data when the output value is not within a tolerance of the required score;
   generating, by the neural network engine, an updated output value based on the feedback data;
   transmitting, by the neural network engine to the score comparator, the updated output value for comparison to the required score;
   receiving, by the neural network engine from the score comparator, a match indication;
   generating, by the neural network engine, user authentication rules recommendations associated with the user for each of the plurality of different transaction types; and
   transmitting, by the neural network engine, the user authentication rules recommendations to the first party computer.

2. The method of claim 1, wherein the updated output value is generated by the neural network engine at regular intervals.

3. The method of claim 1, wherein the user authentication rules recommendations comprise a list of authenticators used to create a model for the user associated with the output value closest to the required score.

4. The method of claim 1, wherein at least one of the first party preferences data, the user behavior data, the user historical data, the authenticator data, and the mobile device metadata is unstructured data.

5. A user authentication rules recommendation system comprising:
   a user mobile device comprising at least one authenticator;
   a first party computer; and
   a rules recommender computer system operably connected to the first party computer and in communication with the user mobile device, the rules recommender computer system comprising:
      a neural network engine operably connected to a plurality of classifiers;
      a score comparator operably connected to the neural network engine; and
      a first party rules engine operably connected to the score comparator;
   and wherein the neural network engine of the rules recommendation computer system is configured to:
      receive first party preferences from the first party computer, the first party preferences data comprising user authentication requirement criteria associated with a plurality of different transaction types, the user authentication criteria comprising a fraudulent transaction tolerance associated with each transaction type of the plurality of different transaction types;
      receive authenticator data associated with a mobile device of the user, mobile device metadata, and at least one of user behavior data and user historical data;
      generate an output value based on the first party preferences data, the authenticator data associated with the mobile device of the user, the mobile device metadata, and at least one of the user behavior data and the user historical data;
      transmit the output value to the score comparator for comparison to a required score specified by the first party;
      receive feedback data from the score comparator when the output value is not within a tolerance of the required score;
      generate an updated output value based on the feedback data;
      transmit the updated output value to the score comparator for comparison to the required score;
      receive a match indication from the score comparator;
      generate user authentication rules recommendations associated with the user for each of the plurality of different transaction types; and
      transmit the user authentication rules recommendations to the first party computer.

6. The system of claim 5, wherein the at least one authenticator comprises at least one of a digital camera, a fingerprint reader, a touch screen, and a microphone for recording voice data.

7. The system of claim 5, wherein the neural network engine is further configured generate the updated output at regular intervals.

8. The system of claim 5, wherein neural network engine is configured to transmit user authentication rules recommendations comprising a list of authenticators used to create a model for the user associated with the output value closest to the required score.

* * * * *

UNITED STATES PATENT AND TRADEMARK OFFICE
CERTIFICATE OF CORRECTION

PATENT NO. : 10,650,128 B2
APPLICATION NO. : 15/787097
DATED : May 12, 2020
INVENTOR(S) : Dawid Nowak, Ashley Waldron and Laurie Nicoletti Page 1 of 1

It is certified that error appears in the above-identified patent and that said Letters Patent is hereby corrected as shown below:

On the Title Page

(72) Inventors:
First named inventor should read as: "Dawid Nowak, Dublin (IE)"
Second named inventor should read as: "Ashley Waldron, Dublin (IE)"

Signed and Sealed this
Thirtieth Day of June, 2020

Andrei Iancu
*Director of the United States Patent and Trademark Office*